Aug. 6, 1957 — R. W. HUGE — 2,801,833
DRIVE SYSTEM FOR MIXERS AND THE LIKE
Filed Jan. 19, 1955 — 3 Sheets-Sheet 1

INVENTOR.
ROBERT W. HUGE
BY Bosworth, Sessions,
Kerrstrom & Lawler
ATTORNEYS.

Aug. 6, 1957 R. W. HUGE 2,801,833
DRIVE SYSTEM FOR MIXERS AND THE LIKE
Filed Jan. 19, 1955 3 Sheets-Sheet 2
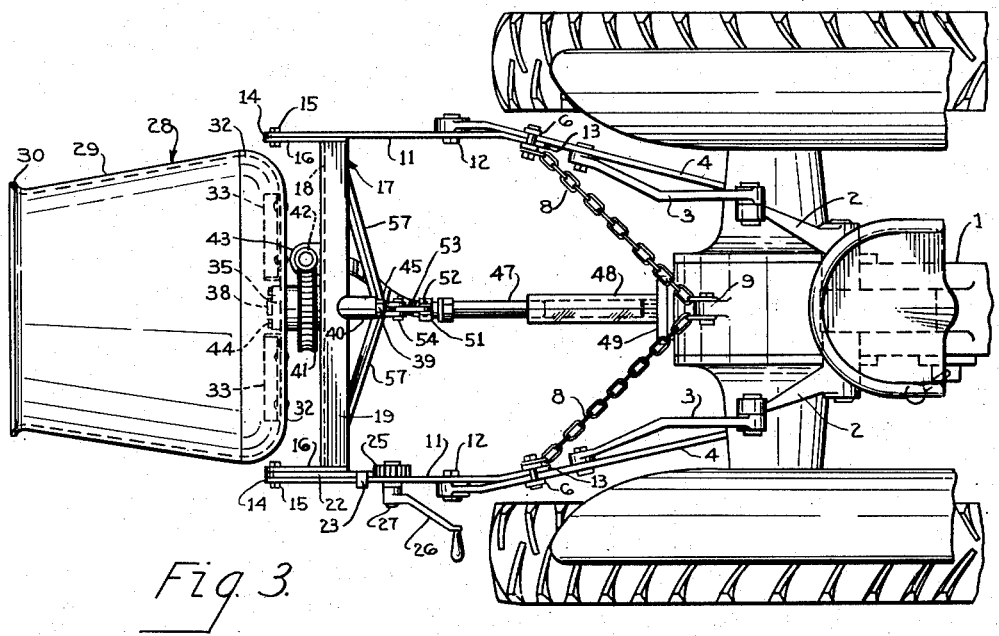
Fig. 3.
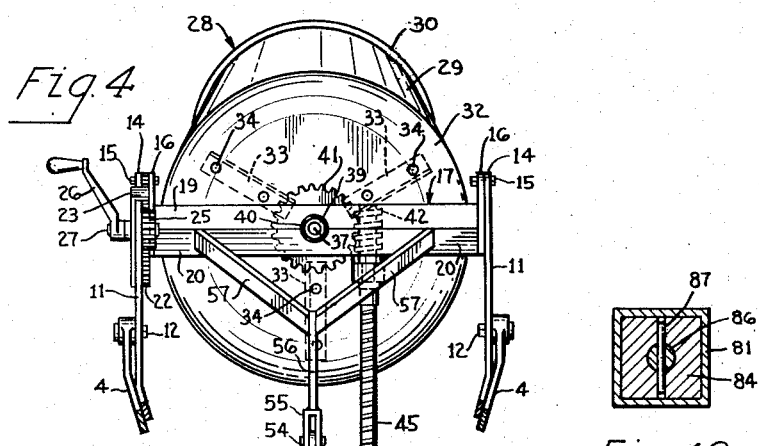
Fig. 4.
Fig. 12.
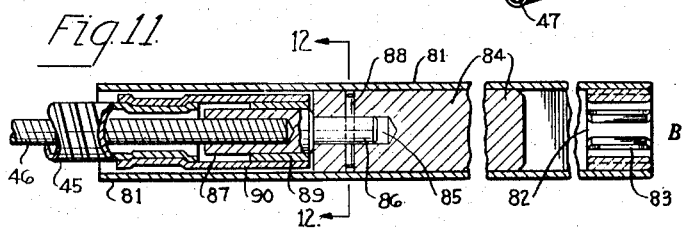
Fig. 11.
INVENTOR.
ROBERT W. HUGE
BY
ATTORNEYS.

Aug. 6, 1957   R. W. HUGE   2,801,833
DRIVE SYSTEM FOR MIXERS AND THE LIKE
Filed Jan. 19, 1955   3 Sheets-Sheet 3
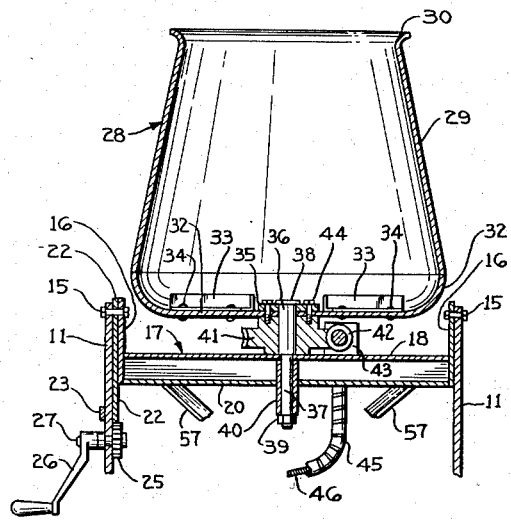
Fig. 5.
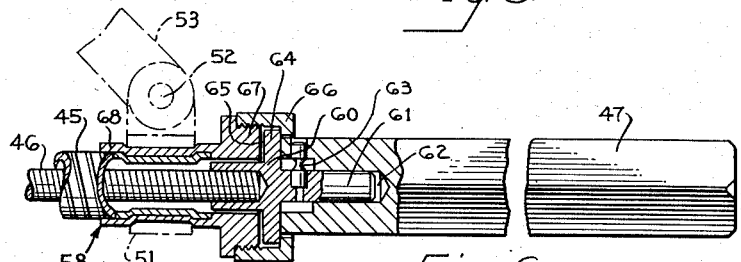
Fig. 6.
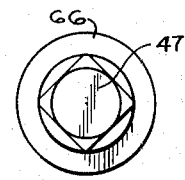
Fig. 7.
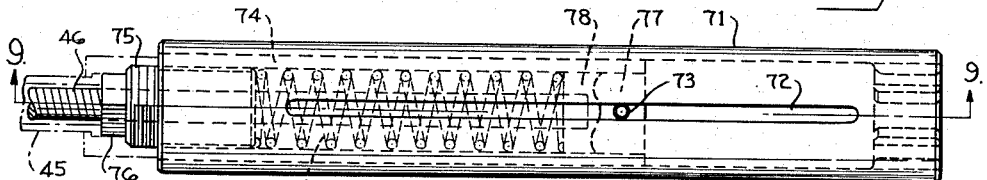
Fig. 8.
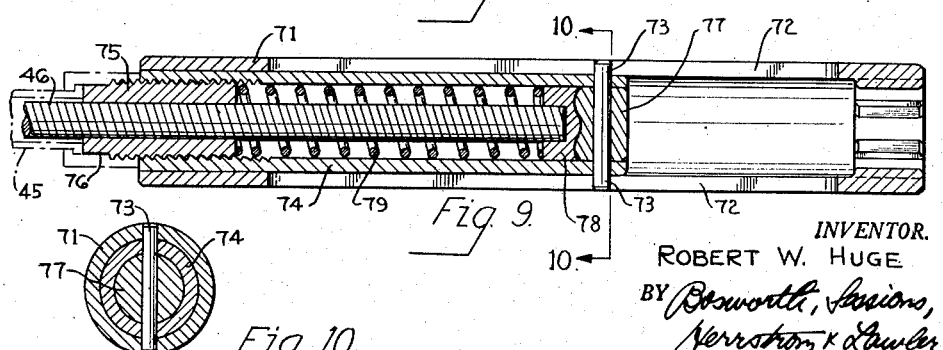
Fig. 9.
Fig. 10.
INVENTOR.
ROBERT W. HUGE
BY
ATTORNEYS.

United States Patent Office 2,801,833
Patented Aug. 6, 1957

2,801,833
DRIVE SYSTEM FOR MIXERS AND THE LIKE

Robert W. Huge, Lucas, Ohio, assignor to
Ernest P. Miller, Sr., Lakewood, Ohio

Application January 19, 1955, Serial No. 482,840

12 Claims. (Cl. 259—177)

This invention relates to a flexible drive system for interconnecting a power source and a device to be driven, particularly a flexible drive system incorporating a telescopic joint. A drive system of this kind is susceptible of utilization in other installations but can be used to especial advantage in a tractor-mixer; i. e., a tractor equipped with an attachment incorporating a rotatable mixing tub. For the reason that the latter type of installation represents a preferred embodiment of the invention, the detailed description will have reference to a tractor-mixer, particularly one for mixing concrete and other heavy materials.

In the past, limitations stemming out of the characteristics required in a tractor-mixer have tended to confine the designer of the drive system to a driven element mounted on or at least in engagement with the periphery of the mixing tub; e. g., a ring-gear, tire, belt or the like, although in some instances the drive has been accomplished in other ways, as by means of sprockets and chains. In very few cases, if any, has it been considered practicable to drive the tub from a worm wheel, gear or like driven element associated with a spindle, pintle or similar axially extending shaft projecting outwardly from the bottom of the tub. In no case, so far as known, has it been thought possible to rotate the tub in its two normal positions and also during movement between them through the medium of a worm wheel, gear, or like element so located in the organization.

The reason presumably resides in the fact that the angle between the horizontal and the axis of rotation tends to change abruptly, sometimes by as much as 90 degrees, when the tub is moved from raised or travel position to lowered or dump position and vice-versa.

If otherwise practicable, a system involving the use of a driven element associated with a shaft on the tub has apparently worthwhile advantages stemming out of its simplicity, but for the reason just mentioned the designer finds himself confronted with the need for introducing a high degree of flexibility into the system in the stretch between the power take-off on the tractor and the shaft on the bottom of the tub. If rigid shafting is specified for the drive system, the use of three or more lengths of shafting and two or more universal joints is necessary, thereby complicating the system; if non-rigid shafting is to be used, provision has to be made for keeping the shafting from working itself into a position in which power transmission is impaired or prevented. Heretofore, so far as known, no one has succeeded in devising a practicable drive system incorporating the needed flexibility in the stretch between the power take-off and a spindle, pintle or other form of shaft on the tub bottom. Those who have given serious thought to this problem have apparently considered it to be difficultly soluble, possibly insoluble.

The problem does, however, admit of the solution employed in the present invention, pursuant to which a flexible shaft is used along with means for taking up a portion of the shaft as the tub is lowered and for releasing it as the tub is raised. As will appear, such means may, if desired, take the form of a telescopic joint between the power take-off and the proximate end of the flexible shaft; if this is the case, a simple worm-and-wheel assembly may be used at the opposite end of the system to transmit to the tub the rotary movement of the flexible shaft. The principal object of the invention may therefore be said to be to provide a highly flexible but nevertheless simple, sturdy and durable drive system for interconnecting a power source and a device to be driven where the capacity of the parts for heavy duty is a basic requirement and where the geometric relationships of the parts are subject to changes of the order of those found, for example, in a closely coupled tractor-mixer.

Other objects, advantages and characteristics of the invention will be apparent from the description which follows and from the accompanying drawings, in which:

Figure 3 is a top plan corresponding to Figure 2; i. e., with the tub in dump position;

Figure 4 is an elevation, seen as if from a plane normal to the axis of the tractor, of that part of the drive system to the rear of the power take-off, the tub being shown in travel position;

Figure 5 is a section on line 5—5 of Figure 2;

Figures 6 and 7 are respectively a side elevation with parts in section and a corresponding end elevation showing the shank end of the flexible shaft;

Figures 8 and 9 are directed to a modification and respectively comprise a side elevation of and a longitudinal section through a slip clutch assembly;

Figure 10 is a section on line 10—10 of Figure 9 through the slip clutch assembly of Figures 8 and 9; and Figures 11 and 12 comprise, respectively, a longitudinal section and a cross section through a telescopic joint of a third type.

Figure 1:
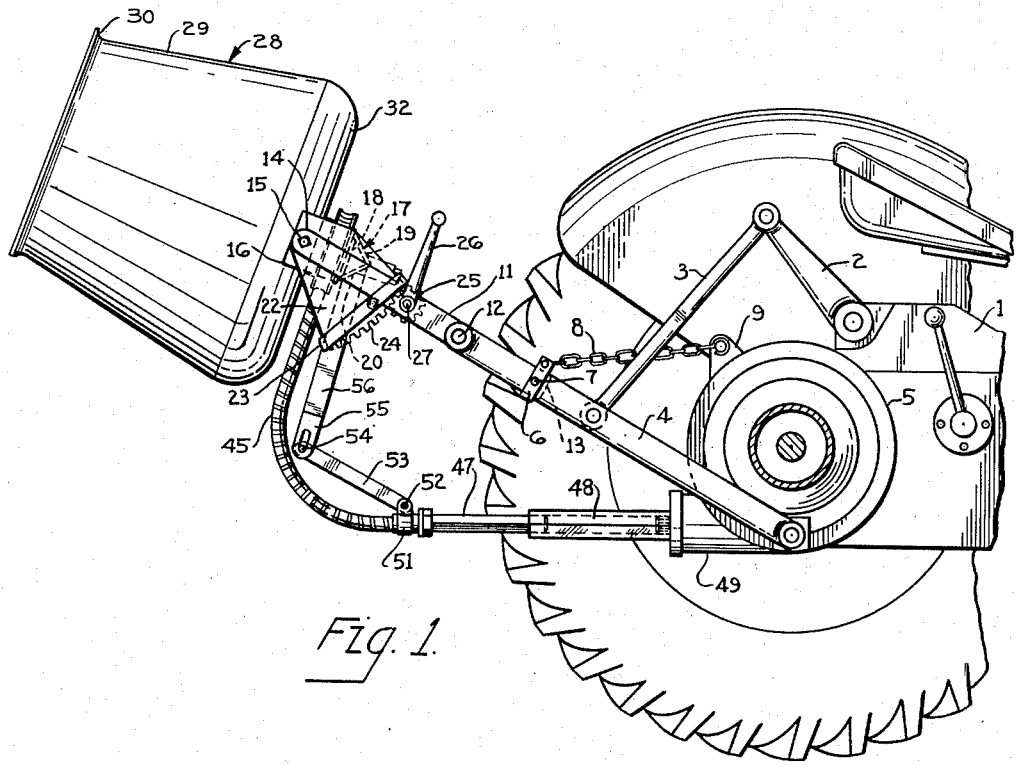
Figure 1 is a side elevation with parts broken away illustrating how the invention may be employed in a tractor-mixer, the mixing tub being shown in raised or travel position.
Figure 2:
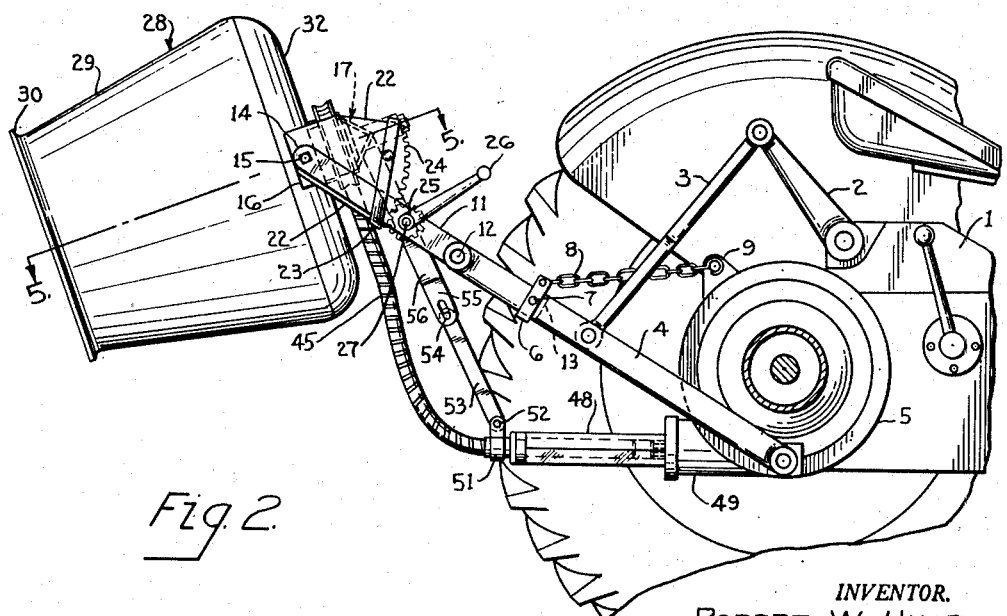
Figure 2 is a similar side elevation showing the tub in lowered or dump position.

In the tractor appearing in Figures 1 to 3, housing 1 contains the hydraulic mechanism used for operating lift arms 2. When the tractor is used for mixing, the lift arms are held by means of the hydraulic mechanism in the elevated position shown in Figures 1 and 2. Attached to the free ends of lift arms 2 are connecting links 3, such connecting links being bowed outwardly as shown in Figure 3. The lower ends of connecting links 3 are attached by pins to the bowed lower links 4. The latter are mounted at their leading ends on differential housing 5. All of the parts so far mentioned are conventional in nature and the manner of their operation is well understood in the art.

Not far from the trailing ends of lower links 4 are strap-like yokes 6 which are held in place on lower links 4 by means of pins 7. Attached in any convenient fashion to the upper ends of yokes 6 are chains 8 of which the opposite ends are attached to the usual bracket 9 mounting the pivot pin for the top link. The top link itself is not used in the present invention and therefore does not appear in the drawings. The reason for providing chains 8 is to keep lower links 4 in raised position in the event that leakage in the hydraulic mechanism tends to allow lift arms 2, connecting links 3 and lower links 4 to move into positions below those which they are intended to occupy. If desired, chains 8 may be replaced by links of suitable length.

Extension links 11, shaped as shown in Figure 3, are mounted on lower links 4. They are attached by pins 12 to the trailing ends of the lower links. Their forward ends 13 project into and beyond strap-like yokes 6. Pins 7 pass through suitable openings in the forward ends 13 of extension links 11. Although the trailing ends 14 of extension links 11 terminate well to the rear of strap-like yokes 6, a highly rigid assembly is thereby provided. In effect, extension links 11 become part of lower links 4. They are, however, susceptible of easy separation therefrom by removing pins 7 and 12 and strap-like yokes 6.

At the trailing ends of extension links 11, pivot pins 15 are provided: see Figure 3. On pivot pins 15 is moveably mounted a tub-supporting yoke consisting of two generally rectangular end plates 16 and a transversely extending member 17. The latter can, if desired, be of built-up construction. Conveniently, but not necessarily, it is of triangular cross section, being made of a rearwardly facing element 18, a top element 19 and a bottom element 20. These three components are welded to each other and to end plates 16 in order to provide a sturdy tub-supporting yoke capable of carrying a minimum load of several hundred pounds.

On one side of this tub-supporting yoke, a moveable quadrant 22 intervenes between end plate 16 and the trailing end of extension link 11, this being most clearly shown in Figures 1, 2 and 3. Quadrant 22 is bolted or welded to adjoining end plate 16 and, like the latter, is pivoted on pivot pin 15 at the outer end 14 of the corresponding extension link 11. To minimize the effects of side play, quadrant 22 is provided with a fixed metal strap 23 coupling it to extension link 11: see Figures 1 and 2. So interconnected, quadrant 22, end plates 16 and transversely extending member 17 can be moved together through an angle of roughly 45 degrees relative to extension links 11.

At the free end of quadrant 22 is an arcuate series of teeth 24 adapted to mesh with a gear 25 mounted for movement with a crank 26. Gear 25 and crank 26 are rigidly affixed to a pin 27 rotatably supported in the adjacent extension link. By rotating crank 26 clockwise from the position shown in Figure 1, quadrant 22 is rotated counterclockwise, moving out of its original position into the position shown in Figure 2. Since quadrant 22 is rigidly affixed to end plate 16, the tub-supporting yoke comprising end plates 16 and transversely extending member 17 moves through the same angle as quadrant 22 out of the position indicated in dotted lines in Figure 1 into the dotted-line position indicated in Figure 2.

Mixing tub 28, which is rotatably mounted in the tub-supporting yoke so formed, incorporates a lightweight shell 29 that is preferably lipped outwardly as at 30. To shell 29 is welded a frusto-conical or rounded bottom 32, likewise of lightweight construction. Reinforcing angle pieces 33, shown or indicated in Figures 3, 4 and 5, are fastened by rivets or similar fastening elements 34 to tub bottom 32. Not depicted in the drawings, but mounted on the inside of shell 29 will usually be one or more mixing blades of conventional construction.

In tub bottom 32 is a centrally located opening surrounded by an annular hub 35 in which is supported the wide portion 36 of a two-stage shaft 36, 37. Of the nature of a pintle, shaft 36, 37 is held in place by means of a head 38 on one end thereof and a nut 39 on the other, the nut 39 bearing against the spacing sleeve 40 shown in Figure 5. The shoulder separating the two stages of the shaft bears against the rearwardly facing portion of transversely extending member 17. The narrow portion 37 of the shaft and the surrounding sleeve 40 project through suitable openings in transversely extending member 17. Thus shaft 36, 37, nut 39 and sleeve 40, which constitute the means for mounting tub 28, in effect become part of the tub-supporting yoke.

Between tub bottom 32 and transversely extending member 17 is a worm wheel 41 driven by a worm 42 mounted for rotation in a bracket 43 that is fixedly attached to the rearward face of transversely extending member 17. This worm and wheel assembly is conventional in design and might, if desired, be replaced by other conventional gearing capable of reducing the speed of the shaft as communicated to the tub to any desired relatively low value. Power transmitted by worm 42 to worm wheel 41 is transmitted by the latter through fastening elements 44 (Figure 5) to hub 35 and tub 28. If desired, however, worm wheel 41 could instead be pinned to a stub shaft rigidly affixed to the bottom of the tub, this being a mechanical equivalent of the construction shown in the drawings.

Worm 42 is connected in suitable fashion to the power delivery end of a flexible shaft consisting of a casing 45 and a core 46 (Figure 5). The opposite end of the flexible shaft may be constructed in any one of various ways but can advantageously be constructed as shown in Figure 6. As there shown, it is provided with a shank 47 of square or other non-circular cross section adapted to fit in telescopic fashion into a receptacle 48 provided with a correspondingly formed non-circular chamber. Receptacle 48 is releasably coupled, as by a pin or the like, to the shaft end forming part of a power take-off unit 49. The driving connection between them is splined so that receptacle 48 will rotate with the shaft end so long as required but may nevertheless be detached from it by withdrawing the receptacle endwise after removing the coupling pin (not shown).

A flexible shaft such as that consisting of casing 45 and core 46 usually permits of fairly wide changes in the geometrical relationships between its two ends; however, if the included angle between them falls much short of a right angle, there is a serious possibility of impairment of function, as evidenced, for example, by the inability to transmit enough torque to the device to be driven. Where the relationships are as indicated in Figure 1, there is usually no difficulty in transmitting the desired amount of torque from power take-off 49 to mixing tub 28, for in that situation the included angle is large enough so as to occasion no problem. On the other hand, if, without some safeguard to prevent impairment of function, the flexible shaft were to be forced into a drastically different position, such as it tends to assume upon change of position of the mixing tub from the raised position shown in Figure 1 to the lowered position shown in Figure 2, an acute angle of rather small magnitude might develop between the ends of the flexible shaft and, if so, could easily interfere with its functioning. Consideration of the matter will reveal that if tub 28 is moved from the raised position of Figure 1 to the lowered position of Figure 2, the flexible shaft tends to be compressed into a short-radius U-curve.

To prevent untoward effects, it is therefore desirable that some provision be made for shortening the effective length of the flexible shaft. In the present invention this is done as hereinafter explained by means of shank 47 and receptacle 48, the former telescoping into the latter. Ordinarily, it is not sufficient to rely on movement of the mixing tub and associated parts to urge shank 47 into receptacle 48; accordingly, a toggle or some equivalent device is preferably provided. Such a toggle may take the form of the linkage best shown in Figures 3 and 4.

In the form of the invention there illustrated, a coupling member 51 encompasses the forward end of the flexible shaft, such coupling member being held in firm engagement with the casing. Mounted on coupling member 51 is a first pivot pin 52 to which is moveably connected a rearwardly extending link 53. By means of a second pivot pin 54, link 53 is moveably connected to a slotted yoke 55 at the lower end of a rigidly formed link-like arm 56 (Figure 4). The latter may be held in place in any suitable way between the ends of two forwardly extending diagonal arms 57 which are welded to lower element 20 of transversely extending member 17. Thus diagonal arms 57, link-like arm 56 and slotted yoke 55 will all move with transversely extending member 17 when tub 28 is moved from raised position to lowered position or vice-versa.

If it is assumed that tub 28 is being lowered from the raised position shown in Figure 1, it is apparent that link-like arm 56 will move counterclockwise through an arc of about 45 degrees, assuming the position illustrated in Figure 2. Acting on pivot pin 54 through yoke 55, link-like arm 56 will force moveable link 53 from the position shown in Figure 1 into the position shown in Figure 2, at the same time urging the forward end of the flexible shaft to the right as seen in Figure 1. Thus the effect of introducing link 53, pivot pin 54 and link-like arm 55 into the organization is to introduce a toggle which, when the parts occupy the positions shown in Figure 2, operates to bias the flexible shaft toward a position in which most or all of shank 47 is within receptacle 48. The result is to shorten the effective length of the connection between receptacle 48 and the worm-and-wheel assembly at the opposite end of the flexible shaft, thereby precluding the development of a situation in which the flexible shaft is prevented from operating effectively.

The manner in which the toggle is connected to the forward end of the flexible shaft will be evident from Figure 6. As there indicated, coupling member 51 is in contact with a fitting 58 which may be constructed in the manner shown or in any other convenient fashion. As shown in Figure 6, a connecting piece 60 is swaged onto core 46, such connecting piece having a forwardly extending cylindrical portion 61 which can project into a cylindrical recess 62 in shank 47. A suitable frangible element such as shear pin 63 serves to connect forwardly extending portion 61 to shank 47. If, however, inadvertent overloading occurs, the shear pin breaks, thereby preventing damage to other parts of the drive system. In the construction shown, shear pin 63 is located forward of the flange 64 on connecting piece 60.

Flange 64 projects outwardly from connecting piece 60 into a hollow 65 that is formed as shown in Figure 6 between an interiorly threaded coupling ring 66 and an exteriorly threaded portion 67 at the end of fitting 58. Extending rearwardly from threaded portion 67 is a ferrule 68 that is deformed from truly cylindrical shape to present a wide groove co-acting as shown with a similarly formed groove in casing 45, thus holding the parts together. If desired, ferrule 68 may intervene as indicated between coupling member 51 and casing 45, although it need not necessarily do so. Thus movement transmitted by the toggle to coupling member 51 is imparted to casing 45 and shank 47, which extends into receptacle 48 within limits determined by the length of the shank and the location of the coupling ring.

A telescopic joint making use of a slip clutch is shown in Figures 8 to 10. In this case, receptacle 71 is provided with diametrically opposed slots 72 which accommodate the ends of a pin 73 extending outwardly from an inner sleeve-like member 74. The latter is threaded to receive a threaded adjusting plug 75 which mounts a coupling ring or the like. Adjusting plug 75 has a squared end 76, seen at the left in Figure 8, which can be engaged by a suitable adjusting tool. At the opposite end of sleeve-like member 74 is a fixed clutch element 77 held in place in proper relation to the rest of sleeve-like member 74 by means of pin 73. Shown as in engagement with fixed clutch element 77 is a moveable clutch element 78 which is swaged onto the forward end of core 46. A coil spring 79 intervenes between adjusting plug 75 and moveable clutch element 78.

In ordinary circumstances, sleeve-like member 74, which corresponds to shank 47, projects into receptacle 71 to greater or lesser extent, depending on the position of the mixing tub and associated parts. If the mixing tub is in the raised position shown in Figure 1, sleeve-like member 74 and pin 73 will be at the left-hand end of receptacle 71 as seen in Figure 9; on the other hand, if the mixing tub is in the lowered position shown in Figure 2, sleeve-like member 74 and pin 73 will be at the right-hand end of receptacle 71 close to the projecting shaft end (not shown) that forms part of the power take-off unit. In the event that the load on the driving system becomes excessive, moveable clutch element 78 rides over fixed clutch element 77, temporarily precluding the further transmittal of power from the power take-off unit to core 46.

Figures 11 and 12 show still a third type of telescopic joint which may be employed if desired. Receptacle 81, which is of square cross section, is provided at its inner end with a square end plug 82 formed with a cylindrical chamber in which are provided splines 83 for attachment to the projecting shaft end forming part of the power take-off unit. Cooperating with receptacle 81 is a shank 84 of square cross section. Within it is a cylindrical recess 85 for the reception of a forwardly directed extension 86 on a connecting piece 87 that is swaged or otherwise rigidly affixed to the forward end of core 46. Extension 86 is coupled to shank 84 by means of a frangible element 88 taking the form of a shear pin. Surrounding connecting piece 87 is a fixed bearing sleeve 89 in which connecting piece 87 can rotate in response to movement communicated to it by shank 84 and extension 86. Bearing sleeve 89 is rigidly affixed by brazing or otherwise to the inside of a ferrule 90 in firm engagement with the end of casing 45.

One of the advantages of the type of telescopic joint shown in Figures 11 and 12 resides in the fact that not only shank 84 but also casing 45 can enter into receptacle 81, the dimensions of the parts being so related as to permit this to occur. In the case of the telescopic joint which appears in Figures 1 to 3 and 6, coupling ring 66 acts as a stop to prevent casing 45 from entering into receptacle 48, this state of affairs being illustrated in Figure 2. However, in situations wherein it is required that the mixing unit be closely coupled to the tractor, it is desirable that no barrier to the entry of casing 45 into the receptacle be presented. In such a case, the shank and receptacle will both be of larger dimensions than the diameter of the fitting or fittings at the end of the shaft, this so that the shaft and its fittings can enter into the receptacle. This is possible in the telescopic joint shown in Figures 11 and 12. It is also possible in that of Figures 8 to 10.

Thus the invention provides a simple, sturdy, durable drive system making use of a flexible shaft to interconnect the power source and the device to be driven where, as in a tractor-mixer, one factor is the need for a high degree of adaptability to changing geometric relationships and another is a capacity for heavy-duty performance. In one sense, these factors oppose each other at least to the extent that a capacity for heavy duty performance tends to suggest rigidity of structure and an adaptability to varying geometric relationships tends to suggest the opposite; namely, structural non-rigidity. In the present invention, the principal heavy-duty elements of the combination; e. g., the power take-off, the worm-and-wheel assembly and the spindle, pintle or other shaft on the mixing tub, are characterized by a high degree of structural rigidity; the intervening elements, including the telescopic joint, by flexibility of operation. The over-all result is to strike a balance between the two factors in a situation which the prior art has appraised as presenting more than average difficulty.

Whether or not employed in a tractor-mixer, the invention is of course susceptible in any given case of changes that will be apparent to those skilled in the art to which it appertains. For example, the toggle need not consist solely of a simple linkage of the type shown, although the simplicity of such a construction is an important advantage; if desired, it may incorporate one or more springs to enhance the biasing action and to facilitate retention of the parts in the positions which they are expected to assume. Instead of being attached directly to the source of power, as in the installation shown in the drawings, the receptacle forming part of the telescopic joint may, if desired, be attached to the end of the flexible shaft in a manner such that it can embrace a shaft extension projecting rearwardly from and forming part of the power source, thus in a sense reversing the described relationship. At the opposite end of the flexible shaft, the worm-and-wheel assembly may of course be replaced by other conventional means for transmitting rotary movement to the device that is being driven; e. g., the mixing tub of the tractor-mixer. Other changes, including application of the invention to tractor-mixers of types other than that shown and described, may be expected from those skilled in the art.

It is intended that the patent shall cover, by summarization in the appended claims, all features of patentable novelty residing in the invention.

I claim:

1. In a drive system for a closely coupled tractor-mixer, a mixing unit; a pivotally mounted yoke on which the mixing unit is mounted; a shaft projecting from the mixing unit into the pivotally mounted yoke; a power source; a telescopic joint connected to the power source; a flexible shaft connected at one end to the telescopic joint; a driving element at the end of the flexible shaft remote from the telescopic joint; and, mounted in juxtaposition to the driving element, a driven element from which the mixing unit is driven, said driven element encompassing the shaft projecting from the mixing unit.

2. A drive system as in claim 1 in which the shaft projecting from the mixing unit is supported in a bearing sleeve.

3. A drive system as in claim 2 in which the bearing sleeve is associated with the pivotally mounted yoke.

4. A flexible driving system for interconnecting a power source and a mixing unit in a closely coupled tractor-mixer comprising a flexible shaft; worm-and-wheel means at one end of the shaft for transmitting rotary movement of the shaft to the mixing unit; and, at the other end of the shaft, a telescopic joint interposed between the shaft and the power source including a rotatable shank of non-circular cross section mechanically coupled at one of its two ends to the shaft and slidingly received at its other end in a non-cylindrical recess within a rotatable driving receptacle, said shank and said receptacle being non-rotatable with respect to each other.

5. A flexible driving system as in claim 4 in which the coupling between the shank and the shaft incorporates a frangible element protecting the shaft against damage in the event of overloading.

6. A flexible driving system as in claim 5 in which the frangible element takes the form of a shear pin.

7. In a closely coupled tractor-mixer, a flexible driving system for interconnecting a power source and a mixing unit comprising a flexible shaft having a core and a casing; means at one end of the core for transmitting rotary movement of the core to the mixing unit; a driving receptacle for receiving the other end of the core, said receptacle being positioned between the power source and the shaft as a whole; and, for intermittently urging the shaft as a whole toward and from the driving receptacle, a toggle operating on the casing.

8. A flexible driving system as in claim 7 in which the toggle consists of a plurality of link-like elements with a pivotal connection between them.

9. A flexible driving system as in claim 8 in which one of the link-like elements forming part of the toggle is connected to means supporting the mixing unit.

10. A tractor-mixer comprising a vehicle of the nature of a tractor that is provided with a power take-off; a rotatable receptacle detachably connected to said power take-off, said rotatable receptacle having therein an elongated chamber; a flexible shaft consisting of a casing and a core one of which is slideably received in said chamber; means preventing relative rotation of said rotatable receptacle and said core, whereby said core is required to rotate with said rotatable receptacle; auxiliary means operating on said casing for sliding said core, within the confines of said chamber, toward and from said power take-off; mounting means supporting said auxiliary means; and, mounted on said mounting means, a mixing tub coupled mechanically to the proximate end of said core.

11. A tractor-mixer as in claim 10 in which the mechanical coupling between the mixing tub and the core includes gearing for reducing the angular speed of the mixing tub below the angular speed of the core.

12. A tractor-mixer as in claim 11 in which the gearing takes the form of a worm on the core and a worm wheel on the mixing tub.

References Cited in the file of this patent

UNITED STATES PATENTS

| | | |
|---|---|---|
| 1,082,243 | Shelton | Dec. 23, 1913 |
| 1,562,704 | Kevan | Nov. 24, 1925 |
| 2,482,976 | Harwood | Sept. 27, 1949 |
| 2,563,669 | Ahearn | Aug. 7, 1951 |